United States Patent
Cooper

(10) Patent No.: US 6,819,306 B1
(45) Date of Patent: Nov. 16, 2004

(54) COLOR CORRECTING AND AMBIENT LIGHT RESPONSIVE CRT SYSTEM

(75) Inventor: Ted J. Cooper, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/290,461

(22) Filed: Apr. 12, 1999

(51) Int. Cl.[7] ............................................. G09G 1/28
(52) U.S. Cl. ........................ 345/22; 345/11; 345/207; 348/325; 348/332; 348/602
(58) Field of Search ..................... 345/22, 150, 152, 345/204, 207, 11, 77, 88, 214; 356/154, 389, 391, 416, 419, 425; 348/179, 210–236, 602, 325, 332, 655, 657, 658

(56) References Cited

U.S. PATENT DOCUMENTS

| | | | |
|---|---|---|---|
| 3,973,118 A | 8/1976 | LaMontagne | 250/226 |
| 4,079,388 A | 3/1978 | Takahama et al. | 354/31 |
| 4,308,456 A | 12/1981 | Van Der Gaag et al. | 250/226 |
| 4,379,292 A * | 4/1983 | Minato et al. | 345/154 |
| 4,386,345 A * | 5/1983 | Narveson et al. | 345/22 |
| 4,653,925 A | 3/1987 | Thornton, Jr. | 356/419 |
| 4,706,108 A * | 11/1987 | Kumagai et al. | 348/178 |
| 4,896,965 A | 1/1990 | Goff et al. | 356/417 |
| 4,952,917 A * | 8/1990 | Yabuuchi | 345/147 |
| 5,272,518 A * | 12/1993 | Vincent | 356/405 |
| 5,500,709 A | 3/1996 | Kazami et al. | 354/416 |
| 5,512,961 A * | 4/1996 | Cappels, Sr. | 348/658 |
| 5,526,058 A * | 6/1996 | Sano et al. | 348/647 |
| 5,568,267 A | 10/1996 | Sunamori et al. | 356/307 |
| 5,710,948 A | 1/1998 | Takagi | 396/50 |
| 5,799,216 A | 8/1998 | Teremy et al. | 396/225 |
| 5,821,917 A | 10/1998 | Cappels | 345/150 |
| 6,081,254 A * | 6/2000 | Tanaka et al. | 345/154 |
| 6,215,962 B1 * | 4/2001 | Cooper | 396/225 |

\* cited by examiner

*Primary Examiner*—Henry N. Tran
(74) *Attorney, Agent, or Firm*—Mikio Ishimaru

(57) ABSTRACT

A light-emitting color display system is provided having an optical sensor system in which a plurality of photosensors are directed towards the light source of the light-emitting color display system to provide outputs proportional to the light energy associated with each color. A processing system responds to the outputs over time with the initial outputs and provides a mechanism to correct color changes in the display system. The color light-emitting display system has a second plurality of photosensors directed away from said light-emitting color display system for providing outputs related to the different illuminants and allowing compensation of the light-emitting color display system for the illuminants.

8 Claims, 2 Drawing Sheets

COLOR CORRECTING AND AMBIENT LIGHT RESPONSIVE CRT SYSTEM

CROSS-REFERENCE TO RELATED APPLICATIONS

The present application contains subject matter related to a concurrently filed U.S. Patent Applications by Ted J. Cooper entitled "OPTICAL SENSOR FOR ILLUMINATION MIXTURES AND METHOD FOR THE DESIGN THEREOF". The related application is assigned to the same assignees as the present application, is identified by Ser. No. 09/290,357, and is hereby incorporated by reference.

The present application also contains subject matter related to concurrently filed U.S. patent applications by Ted J. Cooper entitled "ILLUMINATION DETECTING CAMERA", and "SCANNING AND PRINTING SYSTEMS WITH COLOR DISCRIMINATION". The related applications are also assigned to the same assignees as the present application and are identified by U.S. Pat. Nos. 6,215,962 and 6,252,663, respectively.

TECHNICAL FIELD

The present invention relates generally to light-emitting display systems and more particularly to systems having cathode-ray tubes.

BACKGROUND ART

Human vision is a very poorly understood mechanism that translates photons of various wavelengths into visual pictures that human brains can understand and respond to. The human vision system compensates for scenes under various illumination sources and provides to the viewer a "corrected" visual picture. For example, white tee shirts appear white in human vision regardless of whether the scene happened under sunlight, incandescent light, fluorescent light, or combinations of the aforegoing. When light emitting color display systems are exposed to similar illumination environments, the resulting images appear visually profoundly different.

Although there has been little research into producing realistic colors under different lighting conditions for light emitting color display systems beyond reducing glare, extensive research has been undertaken to predict a mathematical construct for an image called the White Point (WI). The WP is the illumination that occurred at the brightest point in the image and represents what should be considered "white" in the final image. It is assumed that every image has some white objects or highlights in it. When the brightest object, with roughly equal amounts of red, green, and blue is found, the WP operation is constructed by determining the multipliers of the red, green, and blue parts of the brightest point so that the resulting red, green, and blue values will be made equal. Once this transformation is known for the brightest point in an image, it is simultaneously applied to all the other points (which are called dots) in the image. The WP operation typically results in a final image that looks much more realistic with respect to its color balance.

There is a significant shortcoming of the simplistic WP operation described above. It is the assumption that there are some spectrally "white" objects in the image. While this is true the majority of the time for typical pictures, there are also numerous cases where a spectrally "white" object is not present. For example, a close-up picture of a red barn with some blue and green metal signs attached to the barn's side. The dominant color would be red. If the large amount of red is diagnosed as a color cast problem, the brightest part of the image would be the green signs. If the green area is used as the WP, then the resulting picture would be made very blue.

A great deal of research is being conducted in the area of photography to see if the WP of an image can be deduced from just the image itself. However, examples like the barn picture described above will always cause problems.

An alternative solution is to measure the image's illumination source directly. In black and white photography, the measurement was performed with a "light meter". The meter is pointed at the light source, which would be straight up for daylight or towards a spotlight if it were focused on the object of interest. In color photography, a more sophisticated type of "light meter" called a photo spectroradiometer is used. Rather than measuring a single quantity like the black and white light meter, a photo spectroradiometer has to measure numerous points across the visual light spectrum and make a graph of the power at each wavelength that it has found. Once this graph is known, then an accurate representation of the original image can be constructed by removing the influence of the light source from the original scene. For example, an image of a white tee shirt at sunset will have a definite red cast to it. The photo spectroradiometer graph will show strong photon power in the red region of the visible spectrum. Knowing how much influence the illumination source had on the resulting image, a mathematical process is performed to remove the dominant red from the image. The final image has the white tee shirt looking truly white. In the other example of the red barn with the blue and green signs, the photo spectroradiometer graph would show normal daylight present as the illuminant. This means that almost no color correction would be applied to the final image. So in this case the dominant red barn color would be left in the image since that is the normal color that human vision would have seen under midday circumstances. The photo spectroradiometer is the ideal instrument for taking color pictures.

The problem is that a spectroradiometer is both big and expensive. A typical unit is 10 by 6 by 4 inches in size and costs between $5000 to $50,000 in 1998 dollars. It also requires a computer to readout its graphical data and apply it to the image in question. Such a system would be totally inappropriate for determining the WP for a light emitting display system for a $500 to $5000 computer or monitor.

Another problem related to light emitting display systems is that age affects the light emitted by a display system, especially the phosphors for a cathode ray tube. Thus, a system for maintaining consistent light from the display systems has been problematic.

DISCLOSURE OF THE INVENTION

The present invention provides a light-emitting color display system having an optical sensor system in which a plurality of photosensors are directed towards the light source of a light-emitting color display system to provide outputs proportional to the light energy associated with each color. A processing system responds to the outputs over time with the initial outputs and provides a mechanism to correct color changes in the display system.

The present invention further provides a color light-emitting display system having a second plurality of photosensors directed away from said light-emitting color display system for providing outputs proportional to ambient light and allowing adjustment of the light-emitting color display system due to changes in the ambient light.

The present invention further provides the second plurality of photosensors capable of determining the presence of illumination from natural, artificial, and combination sources to maintain the white point of the light-emitting color display system.

The present invention provides a cathode-ray tube having an optical sensor system in which a plurality of photosensors are directed towards the light source of a cathode-ray tube to provide outputs proportional to the light energy associated with each color. A processing system responds to the outputs over time with the initial outputs and provides a mechanism to correct color changes in the display system.

The present invention further provides a cathode-ray tube having a second plurality of photosensors directed away from said cathode-ray tube for providing outputs proportional to ambient light and allowing adjustment of the cathode-ray tube due to changes in the ambient light.

The present invention further provides the second plurality of photosensors capable of determining the presence of illumination from natural, artificial, and combination sources to maintain the white point of the cathode-ray tube.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
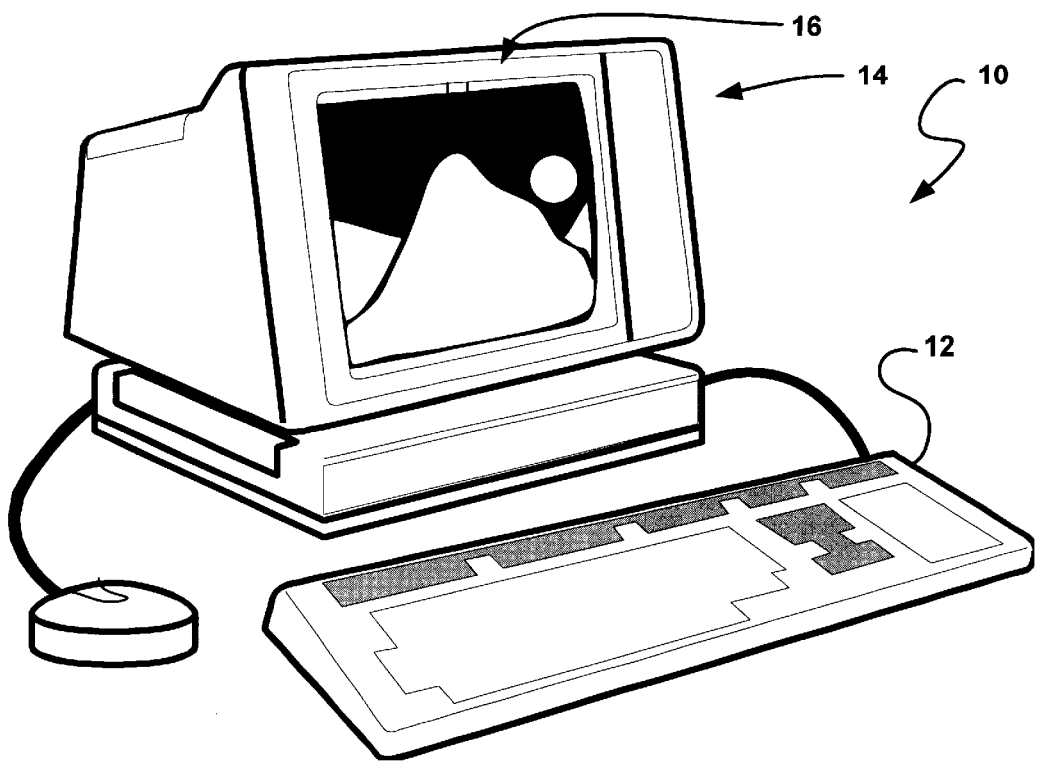
FIG. 1 is an illustration of a computer system having a monitor incorporating the CRT system of the present invention.

Referring now to FIG. 1, therein is shown a computer system 10 which includes a keyboard 12 and a monitor 14. The monitor 14 contains a light emitting display system, such as a cathode-ray tube (CRT) 16, which incorporates the present invention.

Figure 2:
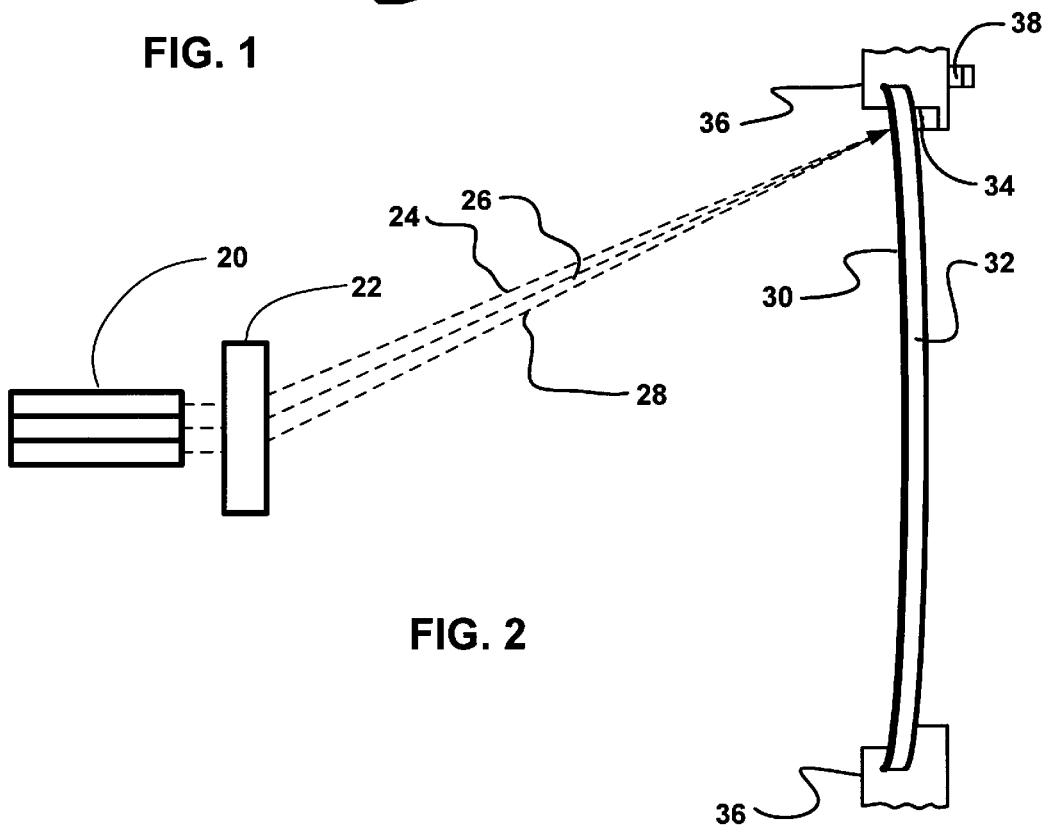
FIG. 2 shows a cross-section schematic of the operational components of an operating CRT in accordance with the present invention.

Referring now to FIG. 2, therein are shown the operative components of the present invention including a cathode-ray gun 20 which is the source of a beam of electrons. A ring magnet 22 focuses and directs electron beams 24, 26, and 28 respectively against red, green, and blue phosphors 30 on a cathode-ray tube screen 32. The screen 32 is a part of an evacuated tube which encompasses the magnet 22 and the gun 20 (the remainder of the tube has been removed to simplify FIG. 2).

Facing the screen 32 is an optical sensor 34 which is held in place by a frame 36. The frame 36 carries an outward facing optical sensor 38.

Figure 3:
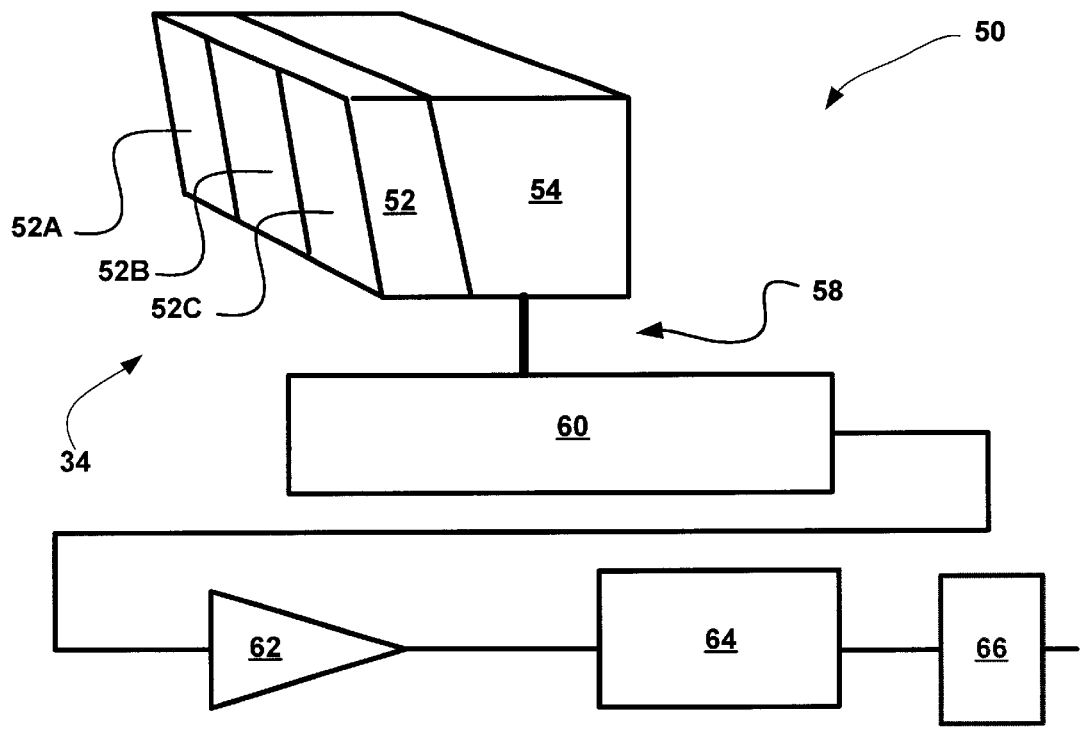
FIG. 3 is the color-correcting optical sensor system used in the present invention.

Referring now to FIG. 3, therein is shown a color-correcting optical sensor system 50 having the optical sensor 34 pointed towards the gun 20 and the phosphors 30. The optical sensor 34 is made up of a photosensitive semiconductor 52 and a support frame 54. The photosensitive semiconductor 52 is covered by bandpass filters 52A through C which are for red, green, and blue phosphor light.

The bandpass filters 52A through C are dyes that are in the form of an ink, paint or gel which can be printed, painted, or silk-screened directly on the photosensitive semiconductor 52. The dye material can further be placed in several layers for increased optical density. The three bandpass filters 52A through C allow the combination to be able to discriminate among the red, green, and blue phosphors 30.

The outputs from the photosensitive semiconductor 52 are connected by display color outputs lead 58 to a multiplexer or sample-and-hold circuitry 60. The analog signals from the sample-and-hold circuitry 60 are provided to an analog-to-digital (A/D) converter 62. The A/D converter 62 provides digital signals to an application specific integrated circuit (ASIC) 64 which could be a modified version of a conventional ASIC used as part of a control system 66 for the gun 20 or magnet 22, or an independent ASIC. The ASIC 60 would include a memory to compare the red, green, and blue signals from the photosensitive semiconductor 52 and provide information as to how the gun 20 and the magnet 22 should be controlled so the picture shown on the screen 32 compensates for aging of the phosphors 30.

Figure 4:
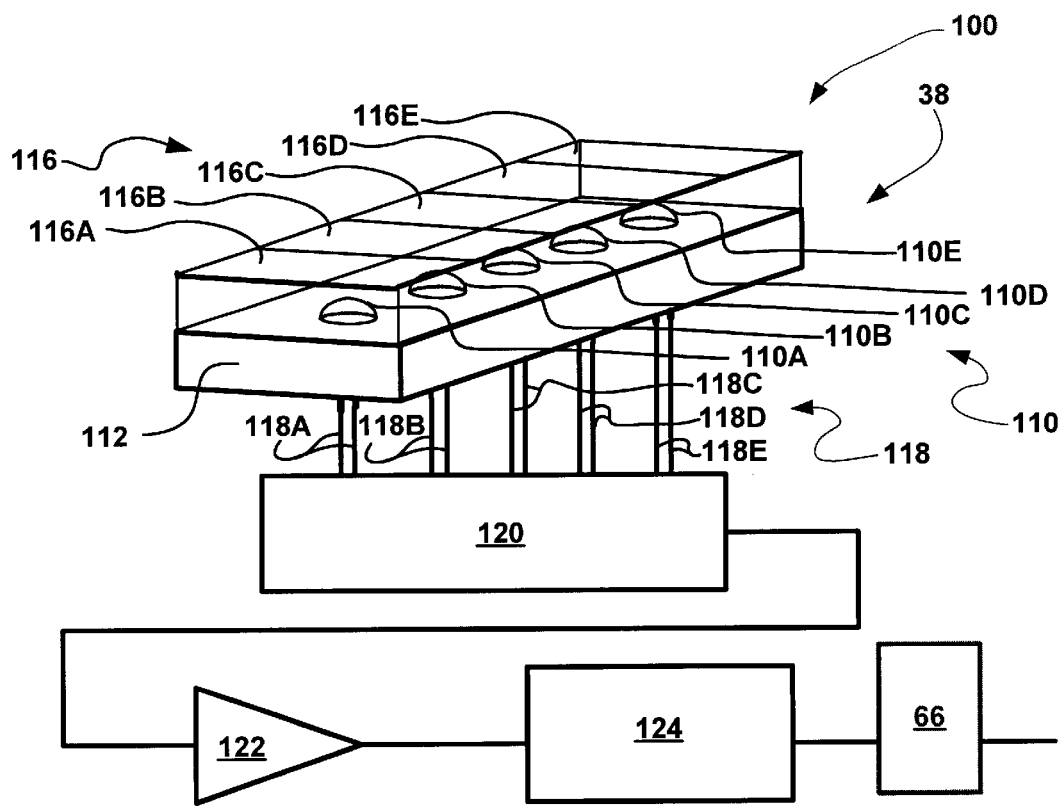
FIG. 4 is the ambient light responsive optical sensor system used in the present invention.

Referring now to FIG. 4, therein is shown an ambient illumination optical sensor system 100. The optical sensor system 100 includes the optical sensor 38 which contains a plurality of photodiodes 110. The photodiodes 110 are secured to a mounting block 112 which is covered by a clear, optically transparent resin 114. The resin 114 is provided with a flat surface on which a plurality of bandpass filters 116 are disposed.

The bandpass filters 116 are dyes, which are in the form of an ink, paint or gel which can be printed, painted, or silk-screened on the resin 114. The dye material can further be placed in several layers for increased optical density. The different bandpass filters 116 allow the combination to be able to discriminate among different portions of the spectrum of light falling on the bandpass filters 116. With the proper selection of bandpass filters, it is possible to distinguish the particular portions of the spectrum which contain particular intensities which are characteristic of various types of natural and artificial light.

The particular bandpass filter dyes selected and the number of photodiodes in the plurality of photodiodes is determined so as to integrate the signals that are derived from the plurality of photodiodes 110 with their respective bandpass filters 116 in response to various mixtures of illumination. In the present invention five photodiodes 110 A through E are shown with their accompanying bandpass filters 116 A through E. Not more than seven photodiodes 110 would probably be required for a CRT 16.

The outputs from the plurality of photodiodes 110 are connected by a plurality of ambient color outputs leads 118 to a multiplexer or sample-and-hold circuitry 120. The analog signals from the sample-and-hold circuitry 120 are provided to an analog-to-digital converter 122 which provides digital signals to an application specific integrated circuit (ASIC) 124 which could be a modified version of a conventional integrated circuit used as part of the computer system 10 or an independent ASIC. The ASIC 124 would compare the signals from the plurality of photodiodes 110 and provide information as to how the computer system 10 should be changed to compensate for differences caused by various mixtures of illuminants. Further, by comparing the strengths of the output signals, a determination can be made of the relative strengths or percentages of the various illuminants. In the preferred embodiment, only the relative strengths of two or possibly three illuminants are necessary to compensate a picture.

In operation, the CRT 16 operates in a conventional manner with the gun 20 emitting electrons which are directed by the magnet 22 to provide the electron beams 24, 26 and 28 to red, green, and blue phosphors 30 on the inside of the screen 32. When struck by the electron beam, the phosphors 30 emit visible light which are detected by the optical sensor 34. The optical sensor 34 is constructed so it is below the active display area of the monitor 14 but is still capable of receiving light from the phosphors. The bandpass filters 52A through C would respectively pass red, green, and blue light to the appropriate portion of the photosensitive semiconductor 52.

The outputs from the photosensitive semiconductor 52, through lead 58, will be sent to the multiplexer or sample-and-hold circuitry 60 which takes the signals and sequences them for the A/D converter 62. The A/D converter 62 converts the sequential analog signals into digital signals for the ASIC 64. The ASIC 64 would compare the red, green, and blue signals from the photosensitive semiconductor 52 with the expected signals and provide information as to how the gun 20 and the magnet 22 should be controlled to compensate for the individual aging of the groups of red, green, and blue phosphors 30.

At the same time, the photodiodes 110 would be positioned to receive light from away from the screen 32. The spectrum of light from the illuminants would fall on the top of the bandpass filters 116A through 116E.

The various spectrum segments passed by the bandpass filters 116A through E will provide different intensities of light at different regions of the spectrum on the photodiodes 110A through E depending upon the light illuminating the screen 32. With proper selection of the bandpass filters 116, light can be identified as coming from natural and artificial sources, such as:

early morning sun, mid-morning sun, late afternoon sun, cloud-covered sun, tungsten incandescent, halogen incandescent, standard warm white fluorescent, white fluorescent, standard cool white fluorescent, daylight fluorescent, neon, combinations of the above.

The outputs from the photodiodes 110A through E are provided to the sample-and-hold 120 which sequentially provides the signals to the analog-to-digital converter 122. The analog-to-digital converter 122 provides the digital signals to the ASIC 124.

The ASIC 124 then determines the information as to the type of illuminants, their intensity, and the needed compensation to the colors on the screen 32 to compensate for the illuminants. This information would be provided to the monitor 14's ASIC to adjust the gun and the magnet 22 accordingly.

It should be noted that the photosensitive semiconductor 52 can be sized all the way down to the point at which a single red, green, or blue pixel is being sensed and no bandpass filter would be required because one photosensitive element could sense one phosphor pixel. However, in the preferred embodiment it is preferred that a large number of pixels (picture elements) be sensed so as not to be detrimentally affected by an unusual degradation of a single pixel.

While the invention has been described in conjunction with a specific best mode, it is to be understood that many alternatives, modifications, and variations will be apparent to those skilled in the art in light of the aforegoing description. For example, it could be part of projection televisions, backlit liquid crystal displays, holographic projectors, etc. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A light emitting color display system having an optical sensor system comprising:

a plurality of photosensors directed towards and away from said light emitting color display system for respectively providing a plurality of display and ambient color outputs proportional to the light energy applied thereto respectively from and away from said light emitting color display system, each of said plurality of photosensors associated with a color of light respectively from and away from said light emitting color display system;

a control system for controlling each color of light from said light emitting color display system; and a processing system connected to said plurality of photosensors and said control system, said processing system responsive to said plurality of display and ambient color outputs to compare said plurality of display and ambient color outputs over time with an initial plurality of display and ambient color outputs and including a mechanism for providing information to allow compensation for color differences respectively from and away from said light emitting color display system over time.

2. The display system as claimed in claim 1 wherein:

said plurality of photosensors includes a plurality of bandpass filters for said plurality of photosensors, each of said plurality of bandpass filters having discrimination ability for portions of the color of light from said light emitting color display system and a spectrum of illumination selected from a group consisting of natural light, artificial light, and a combination thereof; and said processing system responsive to said plurality of ambient color outputs to determine the presence of light energy attributable to illumination from the natural light, the artificial light, and the combination thereof, said processing system including a mechanism for providing information to said control system to allow compensation of color light emitted from said light emitting color display system due to illumination on said light emitting color display system.

3. The display system as claimed in claim 1 wherein:

the color display emits cyan, magenta, yellow, and green light; and said plurality of photosensors includes one photosensor for each light.

4. The display system as claimed in claim 1 wherein:

the color display emits red, green, and blue light; and said plurality of photosensors includes one photosensor for each light.

5. A cathode ray tube having a plurality of guns and color phosphors and having an optical sensor system comprising:

a plurality of photosensors directed towards and away from the cathode ray tube and adjacent the phosphors and opposite the guns for respectively providing a plurality of display and ambient color outputs proportional to the light energy applied thereto respectively from and away from the phosphors, each of said plurality of photosensors associated with a different color of light respectively from and away from said phosphors;

a control system for controlling each of said plurality of guns to control the color light energy from the phosphors; and a processing system connected to said plurality of photosensors and said control system, said processing system responsive to said plurality of display and ambient color outputs to compare said plurality of display and ambient color outputs over time with an initial plurality of display and ambient color outputs and including a mechanism for providing information to allow compensation for color differences respectively from and away from the phosphors over time.

6. The cathode ray tube as claimed in claim 5 wherein:

said phosphors emit red, green, and blue light and said plurality of photosensors includes one photosensor for each light.

7. The cathode ray tube as claimed in claim 5 wherein:

said plurality of photosensors includes a plurality of bandpass filters for said plurality of photosensors, each of said plurality of bandpass filters having discrimination ability for portions of the color of light from said phosphors and a spectrum of illumination selected from a group consisting of natural light, artificial light, and a combination thereof; and said processing system responsive to said plurality of ambient color outputs to determine the presence of light energy attributable to illumination from the natural light, the artificial light, and the combination thereof, said processing system including a mechanism for providing information to said control system to allow compensation of color light emitted from the phosphors due to illumination on said cathode ray tube.

8. The cathode ray tube as claimed in claim 7 wherein:

said plurality of bandpass filters have discrimination ability for portions of the spectrums of illumination selected from a group consisting of:

daylight, afternoon light, fluorescent, incandescent, photoflash, and a combination thereof;

said processing system is responsive to said plurality of ambient color outputs to determine the presence of light energy attributable to illumination from:

daylight, afternoon light, fluorescent, incandescent, photoflash, and combination thereof.

* * * * *

UNITED STATES PATENT AND TRADEMARK OFFICE
CERTIFICATE OF CORRECTION

PATENT NO.     : 6,819,306 B1
DATED          : November 16, 2004
INVENTOR(S)    : Cooper It is certified that error appears in the above-identified patent and that said Letters Patent is hereby corrected as shown below:

Column 1,
Line 46, delete "(WI)" and insert therefor -- (WP) --

Column 5,
Line 58, delete "gun" and insert therefor -- gun (20) --

Signed and Sealed this

Eleventh Day of January, 2005

JON W. DUDAS
*Director of the United States Patent and Trademark Office*